United States Patent [19]

Sell

[11] Patent Number: 4,621,306
[45] Date of Patent: Nov. 4, 1986

[54] DISPLAY DEVICE

[75] Inventor: Gerhard Sell, Schmitten, Fed. Rep. of Germany

[73] Assignee: VDO Adolf Schindling AG, Frankfurt am Main, Fed. Rep. of Germany

[21] Appl. No.: 719,763

[22] Filed: Apr. 4, 1985

[30] Foreign Application Priority Data

Apr. 4, 1984 [DE] Fed. Rep. of Germany ....... 3412636

[51] Int. Cl.$^4$ ............................................ G01D 11/28
[52] U.S. Cl. ........................................ 362/29; 362/23; 362/31
[58] Field of Search ................. 362/23, 29, 30, 31, 362/34, 84, 85, 318, 351, 458

[56] References Cited

U.S. PATENT DOCUMENTS

| 2,203,514 | 6/1940 | Bacon | 362/29 |
|---|---|---|---|
| 2,737,146 | 3/1956 | Philipp | 362/29 |
| 2,886,911 | 5/1959 | Hardesty | 362/31 |
| 3,268,659 | 8/1966 | Gibson, Jr. | 362/29 |
| 3,858,909 | 10/1974 | Fitzgibbons | 362/23 |
| 4,096,550 | 6/1978 | Boller et al. | 362/31 |
| 4,115,994 | 9/1978 | Tomlinson | 362/23 |
| 4,181,925 | 1/1980 | Burrows et al. | 362/29 |
| 4,229,783 | 10/1980 | Eberhardt | 362/23 |
| 4,310,871 | 1/1982 | Adachi | 362/23 |
| 4,321,655 | 3/1982 | Bourvrande | 362/29 |

Primary Examiner—Raymond A. Nelli
Attorney, Agent, or Firm—Martin A. Farber

[57] ABSTRACT

The present invention relates to a display device having a transparent display field through which ambient light can pass from the side facing away from an observer to the side facing the observer. Characters and/or symbols can be presented against a light background on the display field. On the side facing the observer, the display field has a light-guide plate 9 of transparent material in which light-dispensing particles 19 are distributed and into which the light from a source of light 12 can be introduced.

27 Claims, 5 Drawing Figures

DISPLAY DEVICE

BACKGROUND OF THE INVENTION

The present invention relates to a display device having a transparent display field through which ambient light can pass from the side facing away from an observer to the side facing the observer, and on which characters and/or symbols can be presented against a light background.

In such display devices, which are developed, for instance, as transmissive liquid-crystal displays, it is known to make the character symbols produced on the cell visible by means of ambient light which passes through the display or by means of a source of light arranged behind the liquid-crystal display. In the first case readability is dependent on the ambient light while in the second case the source of light arranged behind the liquid-crystal display is expensive.

SUMMARY OF THE INVENTION

The object of the present invention is therefore to create a display device which makes excellent readability possible in a simple manner both by ambient light and by illumination by a source of light.

This object is achieved according to the invention by an improvement wherein the display field is provided on the side facing away from the observer, and wherein there is disposed in front of the display field an optical light-guide plate of transparent material in which light-scattering particles are distributed and into which light can be introduced from a source of light. Depending on the existing lighting conditions, readability can be obtained with the light passing through the display field from the side facing away from the observer or with the light from the source of light.

This display device is particularly advantageous if it is located on the instrument panel of an automotive vehicle, where the panel is well illuminated from the rear by light from outside the vehicle and no additional illumination is required in daytime. A liquid-crystal display operating by reflection would require that additional illumination be turned on even in the daytime when it is installed in this location since the lighting conditions within the vehicle are not adequate for good readability. If the characters and symbols to be displayed are displayable as dark against a light background, the light display-surface gives the impression of a light-weight construction.

This effect is enhanced if the scattering particles are transparent particles, in which case the scattering particles can be particles of glass. As a result, the regions of the display field not covered by characters or symbols are clearly transparent when illuminated by the ambient light so that one obtains the impression of a skeleton construction.

When there is only a slight amount of ambient light and the source of light is turned on, the light-guide plate has a diffusely bright appearing background against which the characters and symbols are clearly recognizable with sharp contours.

If the ambient light is sufficient, then the light-guide plate is clear and transparent even when the source of light is on.

The light-guide plate can have, in a simple and space-saving manner, outside of the region thereof which covers the visible region of the display field, a recess into which the source of light extends.

In order to obtain a good distribution of light over the entire width of the light-guide plate, the region of the light-guide plate on the side facing the source of light may have, outside the covering of the display field, a peripheral limitng edge which forms a deflection surface for deflecting the light emanating from the source of light into the region covering the cell. An additional light-guide for the distribution of the light is thus unnecessary.

If the place of production of the light of the source of light is located outside the plane of the light-guide plate then one avoids an illumination of the light-guide plate which is greater in the vicinity of the source of light than in the other regions. In one advantageous embodiment, the display device can be a liquid-crystal display having a transmissive liquid-crystal cell, the light-guide plate being disposed on the side of the liquid-crystal cell facing away from the observer.

In order to avoid direct illumination of the cell when the source of light is connected, a frame which surrounds the viewing region of the cell can be placed between the cell and the light-guide plate.

If cell and/or frame and/or light-guide plate are configured for insertion in guides in a housing then a simple mounting is made possible. At the same time, it is possible to dispense with special fastening elements.

The housing can have a receiver for the source of light.

For the passage of the light, the housing is preferably provided with a continuous window opening in the viewing region of the cell. When the liquid-crystal display is not used, the window opening can be closed on the side facing the observer and/or the side facing away from the observer.

In order to fasten the liquid-crystal display, for instance, on the shelf in the region of the instrument panel, the housing may be provided with a stand. In order to swing the display from a vertical position of use into a horizontal position of non-use, the housing can be connected to the stand by a hinge.

In another advantageous embodiment, opaque permanent characters and/or symbols can be arranged on the display field on the side facing the observer, a movable pointer being associated with said characters or symbols, in which connection particularly good contrast and good sharpness of contour is obtained if the characters and/or symbols are located on the light-guide plate.

The characters and/or symbols can form a scale and the pointer may be pivotable.

If the peripheral edge of the light-guide plate is surrounded by a frame, then no annoying light can emerge therefrom when the source of light is turned on. If the inside of the frame is also made reflective, then the light is reflected back into the light-guide plate. This result can also be obtained by providing the peripheral edge of the light-guide plate with a corresponding coating.

The display device can be configured for emplacement on the instrument panel of an automotive vehicle.

One particular advantage of the display devices of the invention is that light which is introduced into the light-guide plate when the source of light is connected, appears as a diffused-light background for the characters and symbols while avoiding a dazzling of the observer by radiated light. This is particularly important upon use of the display within the field of view of the driver in an automotive vehicle.

BRIEF DESCRIPTION OF THE DRAWINGS

Various embodiments of the invention are shown in the drawing and will be described in further detail below.

Figure 1:
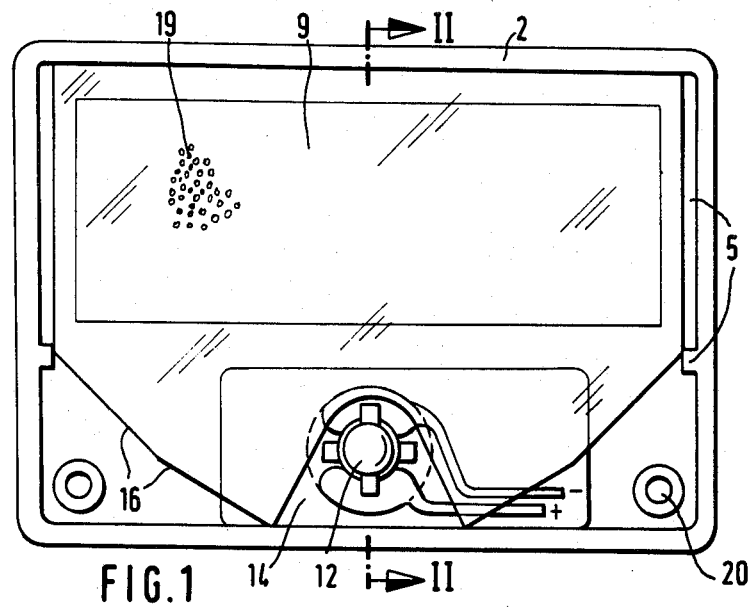
FIG. 1 is a view of a first embodiment of a display device, seen along the line I—I of FIG. 2.
Figure 2:
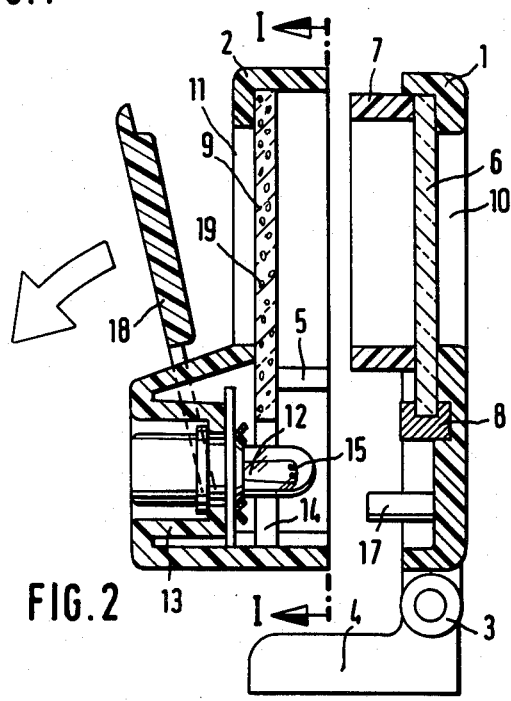
FIG. 2 is a sectional view through the display device along the line II—II of FIG. 1, seen in an exploded view.

The display device shown in FIGS. 1 and 2 is a liquid-crystal display which has a housing formed of two housing shells 1 and 2 which can be connected to each other. A stand 4 is fastened to the housing shell 1 by a hinge 3.

The housing shell 2 is provided on its inside with guides 5 into which, in assembled condition, a liquid-crystal cell 6 as well as a frame 7 on the liquid-crystal cell 6 is inserted and held. In the region of the liquid-crystal cell 6 the housing shell 1 is provided with a window 10.

In the inserted state which is shown, in exploded view in FIG. 2, the liquid-crystal cell 6 is connected at its lower region with a contact strip 8 which is fastened in the housing shell 1 and via which the liquid-crystal cell 6 can be controlled.

Into the guides 5 there is also inserted, within the housing shell 2, a light-guide plate 9 which overlaps a region of a window 11 in the housing shell 2 which is opposite the window 10. In assembled condition, both the liquid-crystal cell 6 and the light-guide plate 9 rest against an end side of the frame 7 and form a transparent display field in the region of the windows 10 and 11. The light-guide plate 9 extends at its bottom out of this viewing region into the region of a source of light 12 which is disposed in a receptacle 13 in the housing shell 2. The source of light 12—an incandescent bulb—extends into a recess 14 in the light-guide plate 9 in such a manner that the place 15 of production of the light of the source of 12 lies outside the plane of the light-guide plate 9.

The peripheral limiting edge of the region of the light-guide plate 9 on the side of the light source is developed as a deflecting surface 16 so that the rays of light impinging upon it from the source of light 12 are deflected in uniform distribution into the viewing region of the light-guide plate 9.

Pins 17 extend from the housing shell 1 and can be inserted and locked in corresponding eyes 20 formed on the housing shell 2. By means of the pins 17 the liquid-crystal display can be assembled after insertion of the source of light 12 and of the light-guide plate 9, frame 7 and liquid-crystal cell 6, no additional holding means for the last-mentioned components being required. When the liquid-crystal display is not being used, the window 11 can be closed by a flap 18 which is pivoted on the housing shell 2.

The light-guide plate 9 is formed of a clearly transparent material in which glass particles 19 which are also clearly transparent are distributed. These particles, in the event of no, or only a small amount of, ambient light and with the source of light 12 connected, serve to disperse the light. As a result, characters and symbols produced in the liquid-crystal cell appear to an observer dark against a uniformly diffusely light background.

If the source of light 12 is turned off and if there is sufficient ambient light, the controlled characters and symbols appear within a light, clearly transparent window.

Figure 3:
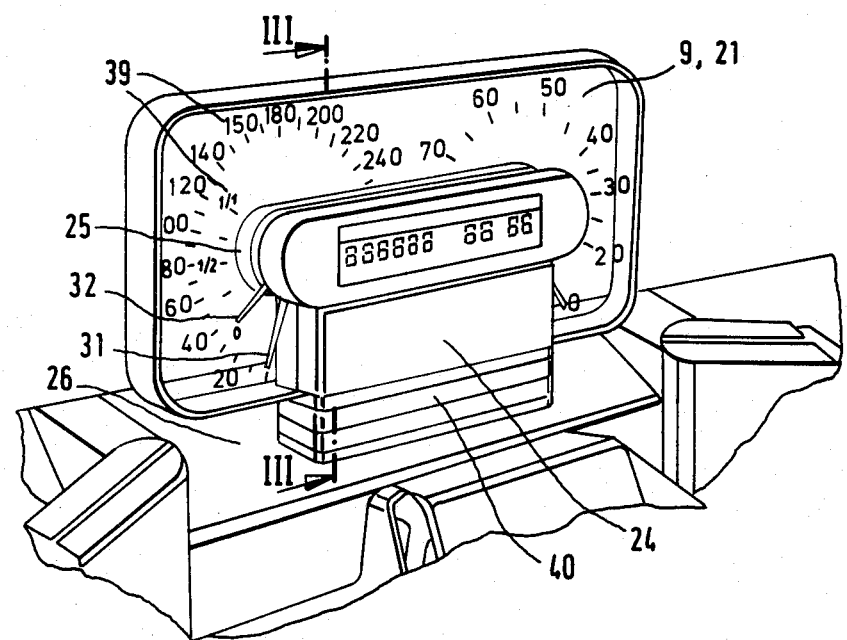
FIG. 3 is a perspective view of a second embodiment of a display device.
Figure 4:
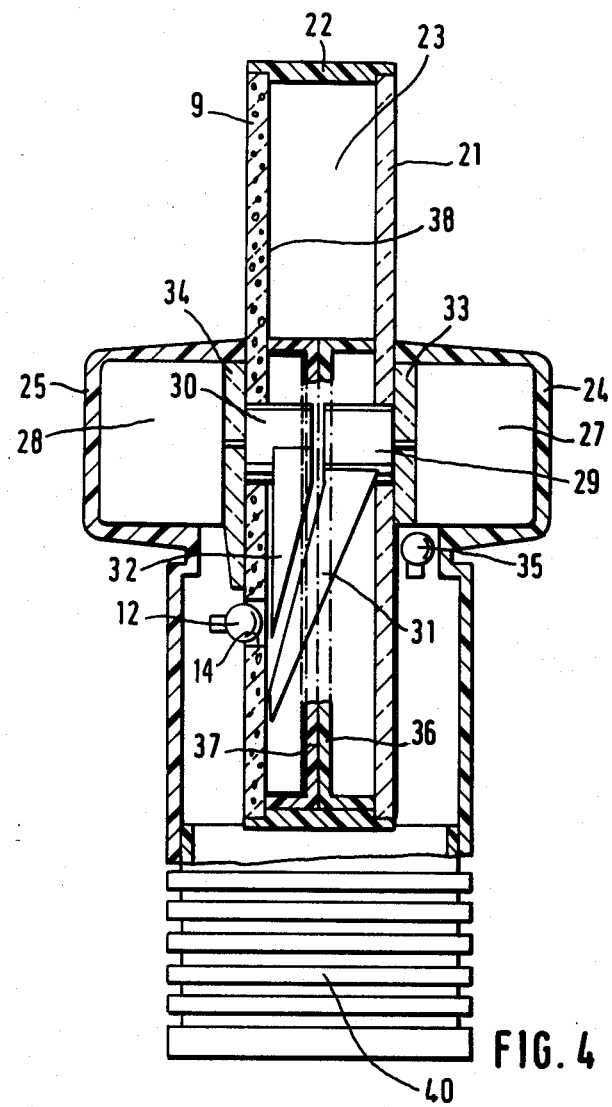
FIG. 4 is a sectional view through the display device of FIG. 3, along the line III—III.

The display device shown in FIGS. 3 and 4 has a light-guide plate 9 which is developed in exactly the same manner as the light-guide plate 9 of FIGS. 1 and 2. It is also provided, outside the viewing region, with a recess 14 into which a source of light 12 extends.

Spaced from the light-guide plate 9, there is a transparent cover plate 21 of the same contour as the light-guide plate 9. A frame 22 which surrounds the peripheral edges of light-guide plate 9 and cover plate 21 closes a space 23 formed between these two plates. Light-guide plate 9 and cover plate 21 together form a transparent display field.

A right-side housing shell 24 and a left-side housing shell 25 receive between themselves the central lower part of the display field and at the same time form a stand by which the display device is positioned on an instrument panel 26 of an automotive vehicle. The display device is positioned in the direct field of vision of the driver such that light entering into the interior of the vehicle through the windshield (not shown) passes through the display field.

In each housing shell 24 and 25 there are located a measuring element 27 and 28 whose shafts extend coaxial to each other into the space 23. The elements 27 and 28 bears hubs 29 and 30 with pivotable transparent pointers 31 and 32 disposed thereon.

Via light-guides 33 and 34 arranged between a measuring element 27 or 28 and the hub 29 or 30 respectively, light from the source of light 12 or a further light source 35 respectively is coupled via the inner region of the hub 29 or 30 respectively into the transparent pointer 31 or 32 respectively for illumination thereof.

In order to avoid a disturbing emergence of light from the housing shells 24 and 25, the parts of the light-guide plate 9 and of the cover plate 21 which extend into the housing shells 24 and 25 are substantially covered by cover caps 36 and 37 disposed within the space 23.

The pointers 31 and 32 are both directed towards the light-guide plate 9 on the side 38 of which, which faces the observer, opaque characters forming scales 39 are printed.

At the ends of the housing shells 24 and 25 directed towards the instrument panel 26 there is disposed one end of a bellows 40 the other end of which is fastened to the instrument panel 26. In this way the display device is swingable.

Precisely in the same way as in the embodiment shown in FIGS. 1 and 2, the characters and scales 39, when the source of light 12 is turned on, appear dark against a uniformly diffuse light background while, when the source of light 12 is disconnected and there is sufficient ambient light, they can be seen in skeleton-like form within a light window which is clear and transparent.

A display device such as shown in FIG. 3 can also be developed such that the display field is formed by a transmissive liquid-crystal cell and the scales can be controlled. Thus the radially outer one of the scales 39 could be switched from a speedometer scale reading in miles per hour to a speedometer scale reading in kilometers per hour, the pointer 31 however being always associated with the two scales.

In one advantageous example, the light-guide plate 9 consists of plexiglass and the particles 19 consist of glass. For the production of the light-guide plate, plexiglass granulate is mixed with 0.2% by weight of glass particles, heated in an extruder to form a viscous mass, and injected into a mold which corresponds to the subsequent light-guide plate. A uniform distribution of the particles within the light-guide plate automatically results herefrom.

For the construction of a transmissive liquid-crystal cell, reference is had to German Pat. No. 21 48 378, both to an introductory portion thereof and to an embodiment disclosed in the first figure thereof. Excerpts from the patent are presented as follows.

One known configuration of liquid crystal device is formed of a source of white light, a collimator lens, a first polarizer, a liquid-crystal cell and a second polarizer which are arranged in series one behind the other. The second polarizer is rotated 90° with respect to the first polarizer. The liquid-crystal cell contains a liquid-crystal layer which is embedded between electrodes. If, in this arrangement, a bundle of rays of white light collected by the collimator lens and polarized by the first polarizer impinges on the liquid-crystal layer, the plane of polarization is rotated by an amount which is dependent on the field strength in the liquid-crystal layer. The amount or rotation in a given field differs for each wavelength. If the light coming from the liquid crystal passes through the second polarizer, the color of the light emerging behind it depends on the field applied. In one special embodiment the transparent conductive electrodes between which the liquid crystal layer is embedded are developed in the shape of crossed grids, i.e. segmented.

The foregoing known device can be used as color filter or as colored display surface. In this connection, when segmented electrodes are used, color contrasts can also be produced.

An improvement of the above-mentioned type of device is achieved when one of the two polarizers is a neutral polarizer and the other polarizer is a selective polarizer.

By a selective polarizer there is understood in this connection a polarizer which polarizes the entire spectrum of white light except for a given spectral color. The neutral polarizer, on the other hand, polarizes the entire spectrum of white light.

With such structure, two features are simultaneously combined with each other. For the specific spectral color the device is equivalent to an arrangement in which only one liquid-crystal cell and one polarizer are present, while for the rest of the spectral region it is an arrangement having two polarizers and one liquid-crystal cell. In this way, degrees of freedom are obtained with which the color contrast can be considerably increased as compared with earlier devices. Color contrasts with complementary colors can even be produced.

The selective and neutral polarizers are preferably linear or circular polarizers.

The liquid-crystal layer which is present between the segmented electrodes consists preferably of a high-ohmic nematic liquid crystal or of a mixture of a cholesterol substance with a nematic substance.

It may be advisable for the liquid-crystal layer or at least one of the glass plates adjoining the liquid crystal to be colored.

In order to obtain any desired color combinations, it is advantageous if a colored absorption foil is introduced into the arrangement.

It is further advantageous for use in transmission mode to provide a dispersing element disposed in the ray path in order to increase the angle of observation of the exit light. In this connection, the electrodes of the liquid-crystal layer are preferably the dispersing elements.

Figure 5:
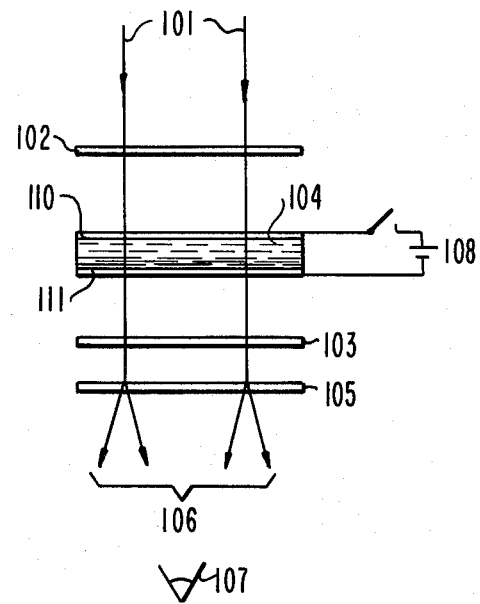
FIG. 5 is a diagrammatic view of a transmissive liquid crystal cell, useful in explaining the operation of such cells.

In the diagrammatic arrangement shown in FIG. 5, 101 is non-polarized white parallel light which strikes against a selective polarization filter 102. This selective polarization filter has the property of polarizing the entire spectrum of the incident white light 101 except for a specific spectral color. By suitable selection of the material for the selective polarization filter 102, the result can be obtained that any desired spectral color passes unpolarized through the polarization filter. Such selective polarization filters, which consist, for instance, of a plastic foil with embedded dichroitic molecules are obtainable on the market. These filters permit the red spectral color to pass through unpolarized. 104 is the liquid-crystal layer of a thickness of a few $\mu m$ which is located between two glass plates 110 and 111 which are coated with transparent electrodes. These electrodes may consist, for instance, of conductive tin oxide. By suitable treatment of the surface of the electrodes, the result can be obtained that the longitudinal axes of the elongated liquid-crystal molecules arrange themselves spontaneously uniformly over the entire layer perpendicular or parallel to the glass plates. In the former case, there is produced a so-called erect layer, the perpendicular position of the molecules being re-established rapidly by itself also after a deformation caused by an electric field. The same applies to the orientation of the molecules parallel to the glass plates. 103 is a neutral polarization filter which polarizes the entire spectrum. The two polarizers 102 and 103 are arranged in blocking position with respect to each other. 105 is a dispersion disk which serves to enlarge the angle of observation when an erected liquid-crystal layer is used, and 107 diagrammatically represents the position of the observer.

Instead of using a separate dispersion disk, the glass plate 111 can just as well produce a dispersing action.

The dispersion disk 105 can also be completely eliminated if the arrangement is such that, without field, the liquid molecules align themselves parallel to the glass plates 110 and 111 and the direction of polarization of the incident light is selected parallel or perpendicular to specifically this preferred direction of the liquid-crystal molecules. In this case, the arrangement is fully effective even upon illumination with diffuse light, as a result of which a large angular range of observation is already assured.

106 is the emerging monochromatic light whose color is determined by the selection property of the first polarization filter 102; 108 is a source of voltage.

If no voltage is present on the liquid-crystal cell 104, then the liquid-crystal molecules are therefore aligned perpendicular or parallel to the glass plates 110 and 111. The liquid-crystal cell is located between the blocking polarizers 102 and 103 and behaves optically for the incident light in the manner of an ordinary isotropic liquid and therefore makes no change in the condition of polarization of the incident light.

The colored unpolarized light now passes through the polarization filter 103, while all other light is blocked due to the blocking position of the polarizers. The cell therefore appears to the observer 117 to be of a single color. If a voltage of an order of magnitude of 10 volts is now applied to the liquid cell, the uniform alignment of the liquid crystal molecules is destroyed. If the electrodes coated on the glass plates 110 and 111 are segmented so that individual segments are controlled, variable characters can be produced in any desired combination. The liquid crystal layer which is deformed non-uniformly at various places by the electric field depolarizes the visible light passing through these places independently of the wavelength so that white light 109 now passes through the polarization filter 103, which light is also made divergent on the dispersion disk 105. The observer 107 therefore in this case perceives a white character against a colored background.

When the electric field is applied to different segments of the electrodes which form a character, this character appears white against a colored background or, if one of the components is correspondingly colored, colored against a differently colored background.

The voltage threshold for the color switching is about 5 volts for a liquid-crystal layer thickness of about 6 μm. The connection times are dependent on the field strength and are about 3 ms for a voltage of 20 volts. The disconnect times depend on the liquid-crystal used and are on the average about 30 ms. Another advantage is that the connect times are shorter by a factor of 5 to 10, for the same field strength, then the connect times of arrangements which utilize the effect of dynamic dispersion. In order to achieve equally short switch times in arrangements which utilize the effect of dynamic dispersion, considerably higher voltages are necessary.

As liquid crystals, there can be used both nematic crystals which show the effect of dynamic dispersion and very highly purified nematic liquid crystals which do not show the effect of dynamic dispersion. Nematic liquid crystals of the last-mentioned type have a conductivity which is several orders of magnitude less than liquid crystal with dynamic dispersion, so that when they are used a longer life can be expected since in general a high conductivity goes hand in hand with a shorter life.

If a mixture of a pneumatic substance with a cholesterol substance is used as liquid crystal then, with the arrangement described, one obtains a two-color presentation with storage effect, in which therefore the character does not disappear upon the disconnecting of the voltage but is retained for some time.

This storage effect is due to the fact that upon the application of an electric field a focal-conic texture is produced from the planar texture, it exerting a strongly depolarizing effect and remaining for a relatively long period of time after the disconnecting of the field.

I claim:

1. A display device having a transparent display field through which ambient light can pass from the side facing away from an observer to the side facing the observer and on which characters and/or symbols can be presented against a light background, and wherein said display device is operable with a source of light and further comprises:

a light-guide plate in the display field on the side facing away from the observer, said light-guide plate being formed of transparent material and being positioned for transmitting ambient light via said light-guide plate from a location behind said light-guide plate through said display field toward said observer, said light-guide plate including light-dispersing particles distributed about said light guide plate, said light-guide plate and said source of light being oriented relative to each other for guiding light from said source of light to a region behind said display field for illuminating said display field.

2. The device according to claim 1, wherein the dispersing particles are transparent particles.

3. The device according to claim 2, wherein the dispersing particles are glass particles.

4. The device according to claim 1, wherein the light-guide plate has, outside of a region thereof which covers a viewing region of the display field, a recess for receiving the source of light.

5. The device according to claim 4, wherein the region of the light-guide plate on the same side as the source of light has, outside a covering of the display field, a peripheral limiting edge which forms a deflection surface for deflecting the light coming from the source of light into the region covering the display field.

6. The device according to claim 1, wherein the place of origin of the light of the source of light is located outside the plane of the light-guide plate.

7. The device according to claim 1, wherein the display device is a liquid-crystal display having a transmissive liquid-crystal cell, the light-guide plate being located on the side of the liquid-crystal cell facing away from the observer.

8. The device according to claim 7, further comprising a frame which surrounds the viewing region of the cell and is located between the cell and the light-guide plate.

9. The device according to claim 7, further comprising a housing having guides, and wherein said cell, said frame and said light-guide plate can be inserted individually in said guides within said housing.

10. The device according to claim 9, wherein the housing has a receptacle for the source of light.

11. The device according to claim 9, wherein the housing has a continuous window opening in the viewing region of the cell.

12. The device according to claim 11, wherein the window opening can be closed on either one of the sides facing towards and away from the observer.

13. The device according to claim 9, wherein the housing has a stand.

14. The device according to claim 13, further comprising a hinge, and wherein the housing is connected to the stand by said hinge.

15. The device according to claim 1, further comprising a movable pointer, and wherein opaque permanent characters and symbols can be arranged independently on the display field on the side facing the observer, said movable pointer being associated with said characters and/or symbols.

16. The device according to claim 15, wherein said characters and symbols can be arranged independently on the light-guide plate.

17. The device according to claim 15, wherein said characters and symbols form a scale.

18. The device according to claim 15, wherein said pointer is pivoted.

19. The device according to claim 15, further comprising
a frame, and wherein
the peripheral edge of the light-guide plate is enclosed by said frame.

20. The device according to claim 19, wherein the inside of the frame is reflective.

21. The device according to claim 1, wherein the display device is configured for mounting on the instrument panel of an automotive vehicle.

22. The device according to claim 1, further comprising
a movable pointer, and wherein
the display field is formed of a transmissive liquid-crystal display with controllable characters and symbols with which said movable pointer is associated.

23. The device according to claim 18, wherein the characters and symbols form a scale.

24. The device according to claim 19, wherein
one of a plurality of controllable scales which can be selected as desired is associated with said movable pointer.

25. The device according to claim 1 further comprising
a pointer, the display device being a liquid crystal display having a transmissive liquid-crystal cell;
a housing supporting said cell; and
pivoting means for pivotally mounting said pointer to said housing to allow said pointer to pass along said display field, said pivoting means including a further light source and means for conducting light from said further light source to said pointer, said pointer being constructed of light-transmissive material to be illuminated by light conducted thereto from said further light source via said light-conducting means.

26. The device according to claim 25, further comprising
means within said housing for shielding said light-guide plate from light associated with said pivoting means.

27. The device according to claim 26 further comprising a transparent cover plate, said cell and said pointer being located between said light-guide plate and said cover plate.

* * * * *